(12) United States Patent
Tsychkov et al.

(10) Patent No.: US 9,118,092 B2
(45) Date of Patent: Aug. 25, 2015

(54) COOLING ARRANGEMENT FOR AT LEAST ONE BATTERY IN A VEHICLE

(75) Inventors: Alexei Tsychkov, Sollentuna (SE); Magnus Kolasa, Arboga (SE)

(73) Assignee: SCANIA CV AB (SE)

( * ) Notice: Subject to any disclaimer, the term of this patent is extended or adjusted under 35 U.S.C. 154(b) by 527 days.

(21) Appl. No.: 13/510,072

(22) PCT Filed: Nov. 18, 2010

(86) PCT No.: PCT/SE2010/051271
§ 371 (c)(1),
(2), (4) Date: Jun. 4, 2012

(87) PCT Pub. No.: WO2011/062551
PCT Pub. Date: May 26, 2011

(65) Prior Publication Data
US 2012/0267080 A1    Oct. 25, 2012

(30) Foreign Application Priority Data
Nov. 20, 2009  (SE) ..................... 0950883

(51) Int. Cl.
*H02J 7/00* (2006.01)
*H01M 10/613* (2014.01)
*B60L 3/00* (2006.01)
(Continued)

(52) U.S. Cl.
CPC ......... *H01M 10/5004* (2013.01); *B60L 3/0046* (2013.01); *B60L 11/1874* (2013.01); *B60L 11/1877* (2013.01); *H01M 2/1077* (2013.01); *H01M 10/502* (2013.01); *H01M 10/5016* (2013.01); *H01M 10/5067* (2013.01);
(Continued)

(58) Field of Classification Search
CPC ........................................... H02J 7/00
USPC ....................................... 320/136
See application file for complete search history.

(56) References Cited

U.S. PATENT DOCUMENTS

| 5,971,290 A | * 10/1999 | Echigoya et al. ........ 237/12.3 B |
| 7,974,095 B2 | 7/2011 | Murata ........................ 361/699 |

(Continued)

FOREIGN PATENT DOCUMENTS

| FR | 2 829 619 | 3/2003 |
| FR | 2 829 619 A1 | 3/2003 |

(Continued)

OTHER PUBLICATIONS

International Search Report dated Feb. 2, 2011 issued in corresponding international patent application No. PCT/SE2010/051271.

(Continued)

*Primary Examiner* — Thuan Do
(74) *Attorney, Agent, or Firm* — Ostrolenk Faber LLP

(57) ABSTRACT

A cooler arrangement for at least one battery (8) in a vehicle (1) includes a cooling circuit (12a-f) with a circulating cooling medium, a circulator (13) to circulate the cooling medium in the cooling circuit (12a-f), and a cooling region (A) where the cooling medium cools the battery (8). The cooler arrangement includes a container (10) with an enclosed internal space (11), in which the battery (8) and the cooling circuit (12a-f) with the circulating cooling medium are situated, and the container (10) includes a heat release region (B) where cooling medium is intended to release heat to surrounding air.

10 Claims, 2 Drawing Sheets

(51) Int. Cl.
*B60L 11/18* (2006.01)
*H01M 2/10* (2006.01)
*H01M 10/625* (2014.01)
*H01M 10/63* (2014.01)
*H01M 10/6563* (2014.01)
*H01M 10/6568* (2014.01)

(52) U.S. Cl.
CPC ........ *H01M10/5077* (2013.01); *B60L 2240/36* (2013.01); *Y02T 10/705* (2013.01); *Y02T 10/7005* (2013.01)

(56) References Cited

U.S. PATENT DOCUMENTS

| 8,048,554 B2 * | 11/2011 | Yang | 429/120 |
| 2004/0261377 A1 | 12/2004 | Sung | 55/385.3 |
| 2007/0018610 A1 | 1/2007 | Wegner | 320/112 |

FOREIGN PATENT DOCUMENTS

| JP | 11-178115 | 7/1999 |
| JP | 2004-146237 | 5/2004 |
| JP | 2006-73256 | 3/2006 |
| JP | 2007-95483 | 4/2007 |
| JP | 2008-84653 | 4/2008 |
| JP | 2009-211829 | 9/2009 |
| WO | WO 2009/005030 | 1/2009 |
| WO | WO 2009/005030 A1 | 1/2009 |
| WO | WO 2009/119037 | 10/2009 |
| WO | WO 2009/119037 A1 | 10/2009 |

OTHER PUBLICATIONS

International Preliminary Report on Patentability dated Feb. 22, 2012 issued in corresponding international patent application No. PCT/SE2010/051271.

* cited by examiner

COOLING ARRANGEMENT FOR AT LEAST ONE BATTERY IN A VEHICLE

CROSS-REFERENCE TO RELATED APPLICATIONS

The present application is a 35 U.S.C. §§371 national phase conversion of PCT/SE2010/051271, filed Nov. 18, 2010 which claims priority of Swedish Application No. 0950883-9, filed Nov. 20, 2009, the contents of which are incorporated by reference herein. The PCT International Application was published in the English language.

BACKGROUND TO THE INVENTION AND PRIOR ART

The present invention relates to a cooler arrangement for at least one battery in a vehicle.

Hybrid vehicles powered by electricity in combination with some other form of fuel are equipped with one or more batteries for storage of electrical energy and with regulating equipment for regulating the flow of electrical energy between the battery and an electrical machine which alternately serves as motor or generator, depending on the vehicle's operating state. The battery and the regulating equipment are inevitably subject to a certain amount of warming during operation. Optimum operation of the battery and the regulating equipment depends on their not being warmed to too high a temperature. The battery must, for example, not warm above a temperature which for a certain type of battery is of the order of 40° C. The regulating equipment may warm to a somewhat higher temperature. The battery and the regulating equipment therefore need to be cooled.

Using air to cool batteries is known, but the air has to be of high quality because batteries are sensitive to pollutants and moisture. A known practice in this respect is for the battery to be situated in the passenger space of vehicles, where the air is of high quality and a fan is used to generate a cooling air flow through the battery. For various reasons, however, it is desirable for the battery to be situated elsewhere in the vehicle than in the passenger space. Another known practice is for the battery to be situated in the engine space of hybrid vehicles, in which case an air conditioning (AC) installation is used to cool the battery, since the air in the engine space is usually too warm and polluted to serve as a suitable cooling medium for the battery. Using an AC installation to cool the battery consumes a relatively large amount of energy. Since an object of hybrid vehicles is to reduce their total energy consumption, it is desirable to cool the battery in a way which consumes less energy.

US 2004/0261377 refers to a cooling device for batteries in a vehicle. In that case a fan draws air in from the surroundings into ducts whereby the air comes into contact with and cools the batteries. A specially configured inlet valve adapted to separating particles and moisture from the air which cools the batteries is used to prevent the air being accompanied by pollutants and moisture.

SUMMARY OF THE INVENTION

The object of the present invention is to propose a cooler arrangement which makes it possible for a battery to be situated at substantially any desired external location on a vehicle while at the same time good cooling of the battery is assured with minimal energy consumption.

This object is achieved with the cooler arrangement of the kind mentioned in the introduction which is characterised by the features herein disclosed. Direct contact of surrounding air with the battery is prevented by the battery being enclosed in a container. The container enclosing the battery may therefore even be situated at locations in the vehicle where the surrounding air contains pollutants and moisture. The container should nevertheless not be situated in the engine space or anywhere else in the vehicle where the air is at a higher temperature than the surroundings, since the cooling effect of the air would thus be reduced. The container therefore also encloses the cooling circuit with the circulating cooling medium. The container thus also prevents surrounding air coming into direct contact with and polluting the cooling medium. In most situations, surrounding air will be at a low enough temperature to provide very good cooling of the circulating cooling medium in the cooling circuit and hence of the battery. Using existing air at the temperature of the surroundings to cool the cooling medium makes it possible, in favourable circumstances, for the cooling medium to provide cooling to a temperature substantially corresponding to the temperature of the surroundings. The container comprises a specific heat release region where the cooling medium is intended to release heat to surrounding air. The configuration of this heat release region is with advantage such that the cooling medium can release heat to surrounding air effectively. The advantage of using surrounding air to cool the cooling medium and hence the battery is that such cooling involves substantially no energy consumption.

The cooling medium circulating in the cooling circuit may be gaseous and be circulated in the cooling circuit by, for example, a fan. Such a gaseous cooling medium may be air or a gas with characteristics which are suitable for the purpose. Alternatively, the cooling medium may be a liquid circulated in the circuit by, for example, a pump, in which case the container may be made more compact, since a cooling circuit with a cooling liquid occupies less space than a cooling circuit with a gaseous cooling medium. The cooling liquid may be water with a suitable additive or some other type of liquid with characteristics which are suitable for the purpose.

According to an embodiment of the present invention, the cooling circuit comprises a first duct in which the cooling medium comes into contact with an internal surface of the heat release region. The heat transfer between the cooling medium and the internal surface in the heat release region is related inter alia to the flow velocity of the cooling medium in the duct. Said circulation means ensures that the cooling medium always flows at a suitable velocity through the duct. The internal surface may comprise flanges or similar protruding portions of material which extend into the duct. Such portions of material increase the internal surface in the heat release region. A large internal heat transfer surface will result in effective cooling of the cooling medium in the heat release region.

According to a preferred embodiment of the present invention, the cooler arrangement comprises an air duct for surrounding air in which the air comes into contact with an external surface of the heat release region, and flow means adapted to causing a forced air flow through the air duct. The ability of the surrounding air to cool the external surface is related inter alia to the flow velocity of the air in the duct. Said flow means, which may be a fan, ensures that the air always flows at a suitable velocity through the air duct. Alternatively, or in combination, said flow means may comprise the air duct being so arranged that the vehicle's movement during operation creates an air flow through the air duct. The external surface may comprise flanges or similar portions of material which extend into the air duct, thereby increasing the external surface in the heat release region and hence promoting the heat transfer between the external surface and the air which flows in the air duct.

According to another preferred embodiment of the invention, the cooling circuit comprises an extra heat release region which is provided with a cooling element adapted to cooling the cooling medium in the cooling circuit when necessary. The cooling medium in the cooling circuit cannot be cooled to a lower temperature than that of the surrounding air in the heat release region.

Said cooling element in the extra heat release region is used in operating situations where the surrounding air is too warm to cool the cooling medium to a desired temperature. The cooling element in the extra heat release region has with advantage a medium flowing through it which is at a considerably lower temperature than surrounding air. The cooling element may be situated downstream of the heat release region and upstream of the cooling region with respect to the cooling medium's direction of flow in the cooling circuit, in which case the cooling medium undergoes two steps of cooling before being led to the battery.

According to another preferred embodiment of the invention, the extra cooling element is an evaporator of an AC installation. The refrigerant in an AC installation may reach a very low temperature during the phase transition in the evaporator. This makes it possible to subject the cooling medium to a second step of cooling to a lower temperature than that of the surrounding air. The cooler arrangement may comprise a control unit adapted to deciding whether it is possible to cool the medium to a desired temperature in the ordinary heat release region and, when such is not the case, to activating the cooling element so that it cools the cooling medium in the extra heat release region to the desired temperature before the medium is led to the battery. In this case the surrounding air may be used for an optimum first step of cooling of the cooling medium, while the remaining cooling of the medium is effected by the cooling element in the extra heat release region. Cooling the cooling medium to a lower temperature than that of the surroundings involves energy consumption. In this case surrounding air is therefore used for an optimum first step of cooling of the cooling medium before the cooling element effects a residual second step of cooling. It is thus possible to minimise the second step of cooling and hence minimise the energy consumption involved in cooling the cooling medium.

According to another embodiment of the present invention, the cooling circuit comprises an alternative duct which has an extent past the ordinary heat release region, and a guide element which is adapted to alternatively leading the circulating cooling medium through the first duct or through the second duct, and the control unit is adapted to controlling said guide element so that the cooling medium is led through the second duct in situations where surrounding air is at too high a temperature to be able to cool the cooling medium in the ordinary heat release region. If the surrounding air is at a higher temperature than the cooling medium, it will warm the cooling medium in the heat release region. To prevent this, when the temperature of the surroundings is too high, the cooling medium is therefore led instead through the second duct. The cooling medium is thus prevented from being warmed by surrounding air in the heat release region. In this case the cooling medium is cooled only by the cooling element in the extra heat release region.

According to another embodiment of the present invention, the container also encloses regulating equipment adapted to regulating the flow of electrical energy to and from the battery, in which case the cooler arrangement comprises a further cooling circuit adapted to cooling the regulating equipment. Such regulating equipment is also subject to warming during operation but may normally be allowed to warm to a somewhat higher maximum temperature than the battery. It may therefore be appropriate to cool the regulating equipment by means of a separate cooling circuit. It is nevertheless possible to cool both the battery and the regulating equipment by means of a single cooling circuit.

BRIEF DESCRIPTION OF THE DRAWINGS

A preferred embodiment of the invention is described below by way of example with reference to the attached drawings, in which.

DETAILED DESCRIPTION OF A PREFERRED EMBODIMENT OF THE INVENTION

Figure 1:
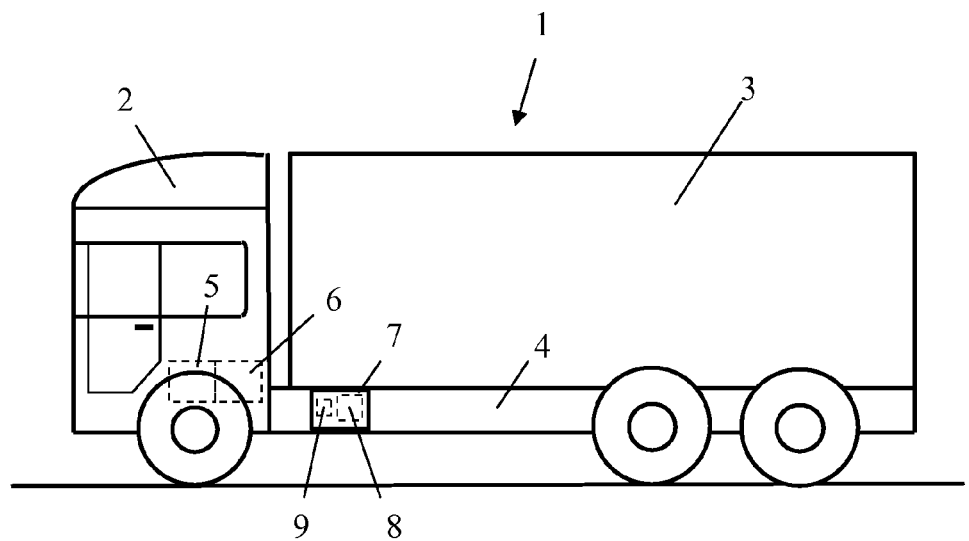
FIG. 1 depicts a hybrid vehicle with a container device for a battery and its regulating equipment.

FIG. 1 depicts a freight vehicle 1 provided with a driver's space 2 and a cargo space 3. The bodywork of the freight vehicle 1 comprises longitudinal loadbearing members 4. The freight vehicle 1 is a hybrid vehicle powered by a schematically depicted combustion engine 5 or by a schematically depicted electrical machine 6. The electrical machine 6 serves as a motor when it powers the vehicle 1 by itself or in conjunction with the combustion engine 5. The electrical machine 6 serves as a generator in situations where the vehicle is being braked, in which case it can itself brake the vehicle up to a certain level of braking. At higher levels of braking the braking process is completed by the vehicle's ordinary brakes. A container device 7 is fastened on one of the loadbearing members 4. A battery 8 for storage of electrical energy and regulating equipment 9 which regulates the flow of electrical energy between the battery 8 and the electrical machine 6 are situated in the container device 7.

Figure 2:
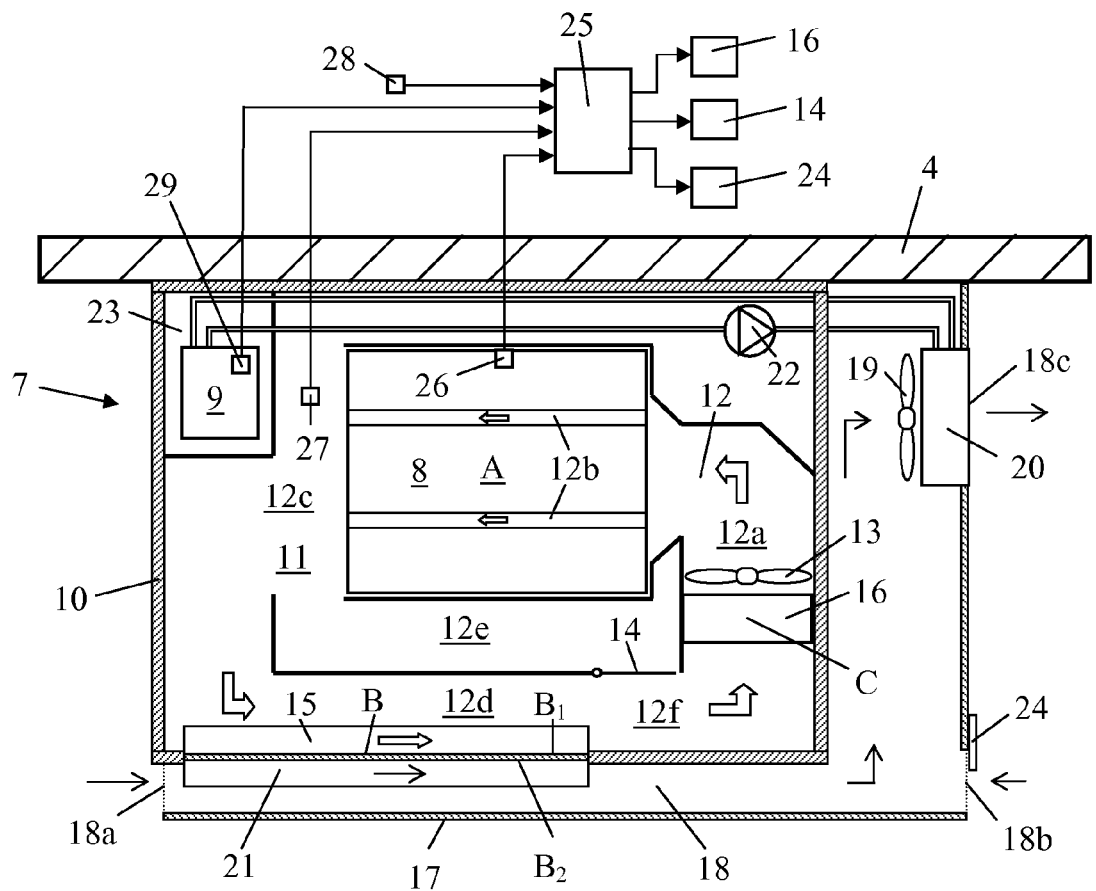
FIG. 2 depicts a cross-sectional view of the container device in FIG. 1
Figure 3:
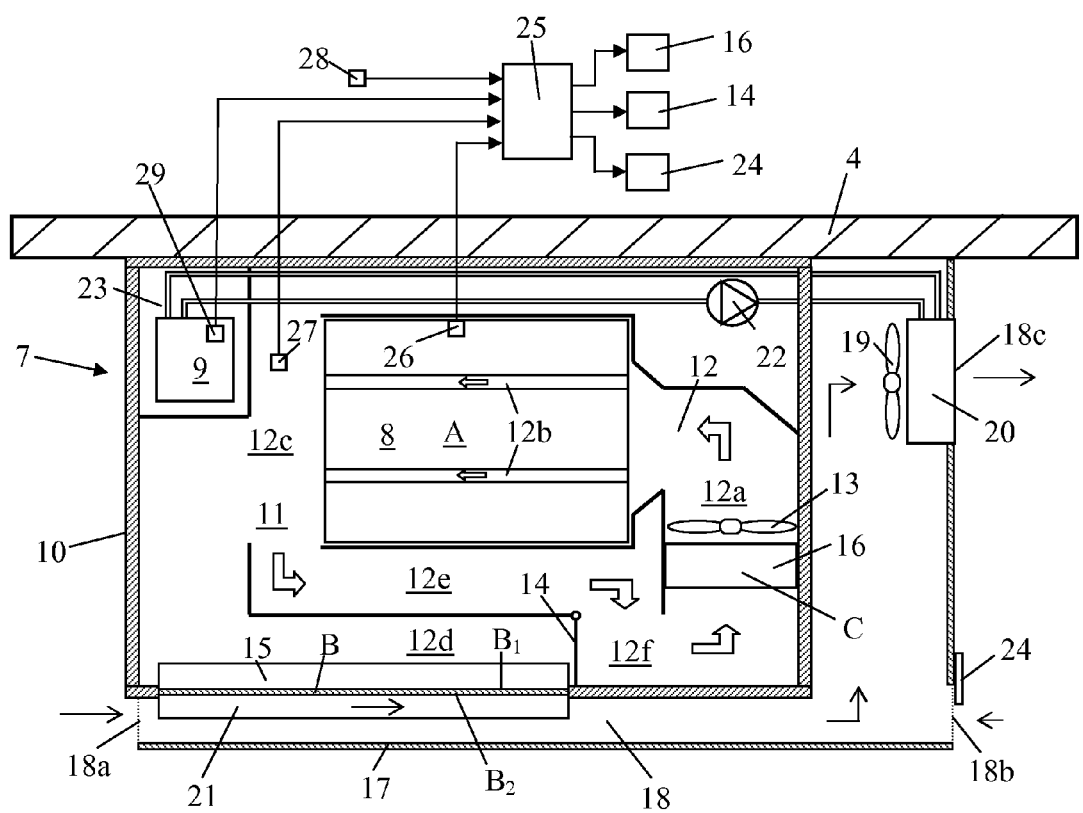
FIG. 3 depicts a corresponding cross-sectional view of the container device in a different operating situation.

FIGS. 2 and 3 depict the container device 7 in more detail. The container device 7 comprises a closed container 10 with an internal space 11. The battery 8 and said regulating equipment 9 are situated within the enclosed space 11. To cool the battery 8, a cooling circuit 12a-f is provided within the container 10. A fan 13 is adapted to circulating a gaseous cooling medium through the cooling circuit 12a-f. The gaseous cooling medium may be air or some other gas which is suitable for use in this context. The cooling circuit 12a-f comprises a space 12a for receiving the cooling medium at a location immediately downstream of the fan 13. From the space 12a the cooling medium is led through cooling ducts 12b which extend through the battery 8 or are in some other way arranged close to the battery 8. The cooling ducts 12b are comprised within a cooling region A where the cooling medium is intended to cool the battery 8. After the cooling medium has passed through the cooling ducts 12b and has left the battery 8, it is received in a space 12c. The space 12c has extending from it a first duct 12d and a parallel second duct 12e. A guide element in the form of a damper 14 is situated close to the respective outlet ends of the duct 12d and the second duct 12e. The damper 14 can be placed in two positions. In a first position depicted in FIG. 2, the outlet end of the first duct 12d is open but the outlet end of the second duct 12e is blocked. In a second position depicted in FIG. 3, the outlet end of the first duct 12d is blocked but the outlet end of the second duct 12e is open. Cooling medium circulated through the first duct 12d comes into contact with an internal surface $B_1$ of a heat release region B. The internal surface $B_1$ of the heat release region B comprises flanges 15. Such flanges 15 provide the internal surface $B_1$ with a large contact surface with the cooling medium in the first duct 12d, resulting in an effective heat transfer between the cooling medium and the internal surface $B_1$. Cooling medium which has flowed through the first duct 12d or the second duct 12e is received in a space 12f from which it is forced by the fan 13 through a cooler arrangement which is here an evaporator 16 of an AC installation. The cooling medium may when necessary undergo a first step of cooling in the evaporator 16 before it again reaches the space 12a. The evaporator 16 is situated in an extra heat release region C for the circulating cooling medium. The cooling medium is circulated in a cooling circuit 12a-12f which is closed.

The container device 7 comprises a casing 17 situated externally about part of the container 10. The casing 17 may take the form of a separate part of or be integral with the container 10. The casing 17 forms together with an external surface of the container 10 an air duct 18 for surrounding air. Surrounding air flowing through the air duct 18 comes into contact with an external surface $B_2$ of the heat release region B. The external surface $B_2$ of the heat release region B comprises flanges 21. Such flanges 21 provide the external surface $B_2$ with a large contact surface with the air which flows in the air duct 18, resulting in an effective heat transfer between external surface $B_2$ and the air.

The air duct 18 comprises two inlet apertures 18a, 18b and an outlet aperture 18c. A fan 19 and a heat exchanger 20 are situated at the outlet aperture 18c. During operation of the fan 19, surrounding air is drawn into the air duct 18 via the inlet apertures 18a, 18b. The heat exchanger 20 is in a separate cooling circuit. A liquid cooling medium is circulated in the separate cooling circuit by a pump 22. After the cooling liquid has been cooled in the heat exchanger 20, it is led to a separate enclosed space 23 within the container 10. The separate space 23 contains the regulating equipment 9. The cooling liquid flows in suitable cooling ducts close to the regulating equipment 9 within the space 23. After it has cooled the regulating equipment 9, the cooling liquid circulates back to the heat exchanger 20. The air flowing out through the outlet aperture 18c cools the cooling liquid in the heat exchanger 20. The size of the inlet aperture 18b is adjustable by means of a positionable closure means 24. The air flow from the two inlet apertures 18a, 18b can be varied by using the closure means 24 to adjust the size of the inlet aperture 18b. Since it absorbs heat in the region B, air led in via the inlet aperture 18a will be at a higher temperature when it reaches the heat exchanger 20 than air which is led in via the inlet aperture 18b. By thus varying the air flows from the two inlet apertures 18a, 18b it is possible to vary the temperature of the air led through the heat exchanger 20 and hence vary the cooling effect which the cooling liquid undergoes in the heat exchanger 20.

A control unit 25 is adapted to controlling the cooling circuit 12a-f which cools the battery 8, and the cooling circuit which cools the regulating equipment 9. The control unit 25 is situated at a suitable location in the vehicle 1. In this case the control unit 25 receives information from a temperature sensor 26 which detects the temperature of the battery 8, a temperature sensor 27 which detects the temperature of the cooling medium in the space 12c, a temperature sensor 28 which detects the temperature of surrounding air and a temperature sensor 29 which detects the temperature of the regulating equipment 9. The control unit 25 can when necessary use this information to activate the AC installation so that the cooling medium is cooled in the evaporator 16 to a desired temperature, to control the damper 14 so that the cooling medium is led through the first duct 12d or through the second duct 12e, and to control the closure means 24 so that the air led to the heat exchanger 20 is at a suitable temperature.

Operation of the vehicle inevitably involves warming of the battery 8 and the electrical components 9. For the battery 8 to function satisfactorily, it must not be at a temperature above a maximum acceptable value which may be 40° C. Nor may the regulating equipment 9 be at a temperature above a maximum acceptable value which may be of the order of 60° C. To prevent the battery 8 and the regulating equipment 9 from being warmer than the maximum acceptable temperatures, the control unit 25 substantially continuously receives information from the temperature sensors 26, 27, 28, 29. The control unit 25 uses information from the temperature sensors 27, 28 to assess whether the cooling medium which has cooled the battery 8 is at a higher temperature than surrounding air. If such is the case, surrounding air may be used to cool the cooling medium in the heat release region B, to which end the control unit places the damper 14 in the position depicted in FIG. 2 so that the cooling medium is led from the space 12c to the first duct 12d. The cooling medium in the first duct 12d is cooled in the heat release region B by air flowing through the air duct 18. Said flanges 15, 21 provide relatively large heat transfer surfaces $B_1$, $B_2$ both for the cooling medium and for the surrounding air. To further promote the heat transfer between the cooling medium in the first duct 12d and the air in the air duct 18, the container 10 in the heat release region B may have an extra-thin wall and/or be made of a material which has very good heat conduction characteristics, e.g. aluminium. In favourable circumstances, the cooling medium may be cooled to substantially the same temperature as the surrounding air, in which case the cooling medium in the first duct 12d and the air in the air duct 18 will flow in the same direction in the heat release region B. Alternatively, they may flow in opposite directions in the heat release region B.

The control unit 25 receives also information from the temperature sensor 26 concerning the battery's temperature. The control unit 25 can use this information and the temperature of the cooling medium which has been cooled in the region B to assess whether the AC installation needs to be activated to subject the cooling medium to a further step of cooling in the evaporator 16. If for example surrounding air is relatively cold and/or the battery 8 has not been loaded too severely during a period of time, it may perhaps be sufficient for the cooling medium to be cooled by surrounding air in the region B, in which case the cooling medium will reach a low enough temperature to be able to cool the battery 8 in such a way that it does not reach a temperature above the maximum acceptable temperature. In this case the cooling medium undergoes only one step of cooling.

If instead the control unit 25 finds that the cooling of the cooling medium by surrounding air in the region B is not sufficient, the AC installation is activated, in which case the cooling medium undergoes a second step of cooling in the evaporator 16 in the extra heat release region C. The AC installation is activated in this case to a level such that the cooling medium reaches a desired temperature in the space 12a downstream of the evaporator 16 so that it can cool the battery 8 to a temperature which is at least equal to the maximum acceptable temperature. Operating the AC installation involves energy consumption. In this case surrounding air is used to subject the cooling medium to an optimum first step of cooling before the AC installation provides any necessary second step of cooling. This minimises the use of the AC installation and hence the energy consumption involved in cooling the battery 8.

If the control unit 25 finds that surrounding air is at such a high temperature that it cannot be used for cooling the gaseous cooling medium in the region B, it places the damper 14 in the position depicted in FIG. 3, in which case the cooling medium is led through the second duct 12e and therefore does not come into contact with the heat release region B. Since in this case surrounding air is at a higher temperature than the cooling medium, the result is that the cooling medium is warmed by surrounding air. In this case the whole cooling of the cooling medium thus takes place in the extra heat release region C of the AC installation's evaporator 16.

The control unit 25 receives also information from the temperature sensor 29 concerning the temperature of the regulating equipment 9. If this temperature tends to exceed the maximum acceptable temperature, the control unit 25 activates the closure means 24 to increase the size of the inlet aperture 18b. A larger amount of cold air is thus led in via the inlet aperture 18b. The temperature of the air led to the heat exchanger 20 drops. The liquid medium in the cooling circuit is thus cooled to a lower temperature, resulting in a more effective cooling of the regulating equipment 9 in the space 23.

The invention is in no way limited to the embodiment depicted in the drawing but may be varied freely within the scopes of the claims. The battery 8 is here cooled by a gaseous cooling medium, but it is possible to cool the battery with a liquid cooling medium. It is also possible to cool both the battery 8 and the regulating equipment 9 in a single cooling circuit by means of a gaseous or liquid cooling medium. The container device 7 is here fastened to a longitudinal member 4, but it may be fastened at substantially any desired location in a vehicle where it is in contact with air which is at the temperature of the surroundings. If the vehicle is a bus, the container device 7 with the battery 8 and the regulating equipment 9 may be situated on the roof of the bus.

The invention claimed is:

1. A cooler arrangement for at least one battery in a vehicle, which arrangement comprises:
    a cooling circuit for containing circulating cooling medium;
    a circulation device configured and operable for circulating the cooling medium in the cooling circuit;
    a cooling region where the cooling medium cools the battery;
    a container defining an enclosed internal space in which the battery and the cooling circuit with the circulating cooling medium are situated;
    the container comprises a heat release region where the cooling medium releases heat to surrounding air; and
    an air duct for surrounding air and in which the air comes into contact with an external surface of the heat release region outside the internal space, and a flow device forcing an air flow through the air duct,
    wherein the cooling circuit further comprises an extra heat release region provided with a cooling element operable for cooling when necessary the cooling medium which is circulated in the cooling circuit, and
    a control unit configured and operable for deciding whether it is possible to cool the cooling medium to a desired temperature in the heat release region and, if not, for activating the cooling element so that it cools the cooling medium in the extra heat release region to a desired temperature before the cooling medium is led to the battery.

2. A cooler arrangement according to claim 1, wherein the cooling circuit comprises a first duct, the heat release region of the container includes an internal surface in the first duct, the cooling medium comes into contact with the internal surface of the heat release region.

3. A cooler arrangement according to claim 2, wherein the internal surface comprises flanges or portions of material which extend into the first duct.

4. A cooler arrangement according to claim 2, wherein the external surface comprises flanges or portions of material which extend into the air duct.

5. A cooler arrangement according to claim 1, wherein the cooling element is an evaporator of an air conditioning installation.

6. A cooler arrangement according to claim 1, wherein the cooling circuit comprises:
    an alternative duct which has an extent past the heat release region; and
    a guide element alternatively leading the circulating cooling medium through the first duct or through the second duct, the control unit configured and operable for controlling the guide element so that the cooling medium is led through the second duct in situations where surrounding air is at too high a temperature to be able to cool the cooling medium in the heat release region.

7. A cooler arrangement according to claim 1, wherein the container further comprises regulating equipment configured and operable for regulating the flow of electrical energy to and from the battery, and cooler arrangement comprises a further cooling circuit configured and operable for cooling the regulating equipment.

8. A cooler arrangement according to claim 1, wherein the external surface comprises flanges or portions of material which extend into the air duct.

9. A cooler arrangement according to claim 1, wherein the cooling element of the extra heat release region has a medium flowing through it which is at a considerably lower temperature than the surrounding air.

10. A cooler arrangement according to claim 1, wherein the cooling element is situated downstream of the heat release region and upstream of the cooling region with respect to the cooling medium's direction of flow in the cooling circuit, whereby the cooling medium undergoes two steps of cooling before being led to the battery.

* * * * *